(12) United States Patent
Mukherjee et al.

(10) Patent No.: US 12,082,123 B2
(45) Date of Patent: Sep. 3, 2024

(54) REALLOCATION OF AVAILABLE POWER AMONG DEVICES IN A GROUP

(71) Applicant: Dell Products L.P., Round Rock, TX (US)

(72) Inventors: Rishi Mukherjee, Bangalore (IN); Sivakumar Swamy, Bangalore (IN); Sandeep Venkatesh Pai, Karnataka (IN); Shivendra Katiyar, Karnataka (IN); Harshendra Shetty, Karnataka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 399 days.

(21) Appl. No.: 17/581,388

(22) Filed: Jan. 21, 2022

(65) Prior Publication Data

US 2023/0239809 A1    Jul. 27, 2023

(51) Int. Cl.
| | | |
|---|---|---|
| *H04W 52/34* | (2009.01) | |
| *H04W 28/24* | (2009.01) | |
| *H04W 52/28* | (2009.01) | |
| *H04W 72/044* | (2023.01) | |

(52) U.S. Cl.
CPC ......... *H04W 52/346* (2013.01); *H04W 28/24* (2013.01); *H04W 52/281* (2013.01); *H04W 72/0473* (2013.01)

(58) Field of Classification Search
CPC . H04W 52/346; H04W 28/24; H04W 52/281; H04W 72/0473; Y02D 10/00
See application file for complete search history.

(56) References Cited

U.S. PATENT DOCUMENTS

| | | | | |
|---|---|---|---|---|
| 2008/0222435 | A1* | 9/2008 | Bolan | G06F 1/3203 |
| | | | | 713/310 |
| 2009/0055665 | A1 | 2/2009 | Maglione et al. | |
| 2012/0137158 | A1* | 5/2012 | Nelluri | H05K 7/1498 |
| | | | | 713/340 |

(Continued)

OTHER PUBLICATIONS

Branover, Alexander, Denis Foley, and Maurice Steinman. "Amd fusion apu: Llano." Ieee Micro 32.2 (2012): 28-37. (Year: 2012).*

(Continued)

*Primary Examiner* — Sharad Rampuria
(74) *Attorney, Agent, or Firm* — Amin, Turocy & Watson, LLP

(57) ABSTRACT

The described technology is generally directed towards reallocating power to devices in a group, such as a rack of servers in a datacenter, when no power headroom remains available. Respective devices, which are classified into respective classes corresponding to respective priority device class levels, have power distributed thereto. Upon determining that available power headroom for power capacity distribution among the group of devices has reached an available power capacity distribution lower limit (e.g., zero), reallocation is performed by increasing power capacity allocated to a first device of a higher priority level class, and decreasing power capacity allocated to a second device of a lower priority level class. For more classes, such as high, medium and low, the power can be decreased among the lower priority level classes by a defined ratio, e.g., two-to-one between the medium and low priority classes.

20 Claims, 12 Drawing Sheets

(56) References Cited

U.S. PATENT DOCUMENTS

| | | | |
|---|---|---|---|
| 2013/0226362 A1 | 8/2013 | Jagadishprasad et al. | |
| 2013/0318371 A1* | 11/2013 | Hormuth | G06F 11/3062 |
| | | | 713/320 |
| 2015/0026495 A1 | 1/2015 | Jain et al. | |
| 2019/0377395 A1 | 12/2019 | Kaburlasos et al. | |

OTHER PUBLICATIONS

Non-Final Office Action received for U.S. Appl. No. 17/644,020, dated Apr. 13, 2023, 36 pages.

Notice of Allowance for U.S. Appl. No. 17/644,020 dated Dec. 11, 2023.

"Support for Dell EMC OpenManage Enterprise Power Manager," https://www.dell.com/support/kbdoc/en-us/000176254/support-for-dell-emc-openmanage-enterprise-power-manager-and-power-center, Dell Technologies, accessed Dec. 13, 2021, 16 pages.

"Dell EMC OpenManage Power Center 4.1," User's Guide, Sep. 2018, Rev. A00, 119 pages.

Mukherjee, et al. "Distribution of Available Power to Devices in a Group" U.S. Appl. No. 17/644,020, filed Dec. 13, 2021, 49 pages.

\* cited by examiner

|  | T1 | | T2 | | T3 | |
|---|---|---|---|---|---|---|
|  | P1 | P2 | P1 | P2 | P1 | P2 |
| S1 |  | 250W | 409W | 400W | 473W | 473W |
| S2 |  | 350W | 573W | 500W | 591W | 591W |
| S3 |  | 300W | 453W | 427W | 501W | 501W |
| S4 |  | 200W | 302W | 200W | 235W | 235W |
| S5 |  | 200W | 264W | 173W | 200W | 200W |
| G1 |  | 1300W | 2000W | 1700W | 2000W | 2000W |
| E |  | 700W |  | 300W |  | 0W |

FIG. 5

|    | T1 | | T2 | | T3 | | T4 | |
|----|----|----|----|----|----|----|----|----|
|    | P1 | P2 | P1 | P2 | P1 | P2 | P1 | P2 |
| S1 |    | 250W | 409W | 400W | 473W | 473W | 485W | 473W |
| S2 |    | 350W | 573W | 500W | 591W | 591W | 606W | 591W |
| S3 |    | 300W | 453W | 427W | 501W | 501W | 489W | 501W |
| S4 |    | 200W | 302W | 200W | 235W | 235W | 229W | 235W |
| S5 |    | 200W | 264W | 173W | 200W | 200W | 191W | 200W |
| G1 |    | 1300W | 2000W | 1700W | 2000W | 2000W | 2000W | 2000W |
| E  |    | 700W |      | 300W |      |      |      | 0W |

FIG. 7

REALLOCATION OF AVAILABLE POWER AMONG DEVICES IN A GROUP

BACKGROUND

In a datacenter or similar environment having many devices, available power headroom can be distributed, e.g., periodically, among a group of devices according to a policy. A group can be the entire set of devices in a datacenter, a related set of devices (e.g., those in a specific rack) or any arbitrary set of devices.

However, there are situations in which there is no power headroom available to further distribute. In practice, such situations can be prominent, such as in large datacenters particularly in cloud-based deployments. When this occurs, workloads are starved for power and their throughput suffers. This can have implications with respect to service level agreements, because, for example, a cloud service provider has to pay a penalty to each cloud service consumer per service level agreement that the provider fails to meet.

BRIEF DESCRIPTION OF THE DRAWINGS

The technology described herein is illustrated by way of example and not limited in the accompanying figures in which like reference numerals indicate similar elements and in which:

FIG. 5 is a table showing example individual power consumptions of devices at different time intervals, and example power limits assigned to the devices for the time intervals, wherein the power limits can be based on the individual power consumptions and other data, in accordance with one or more embodiments described herein.

FIG. 7 is a table showing example individual power consumptions of devices after reallocation that occurs when no power headroom is available, in accordance with one or more embodiments described herein.

DETAILED DESCRIPTION

Figure 1:
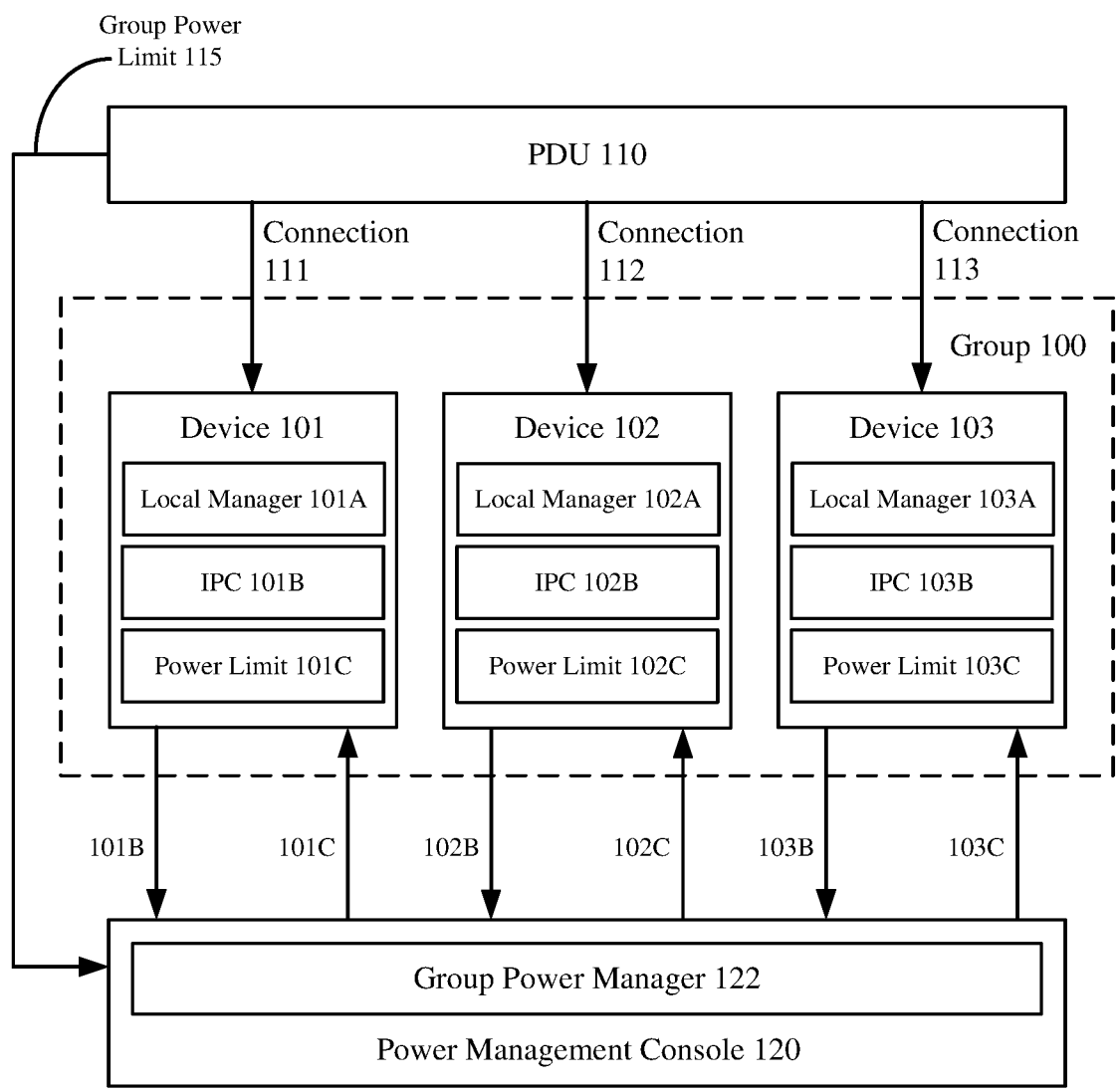
FIG. 1 illustrates an example group of devices and a power management console configured to manage power consumption of the devices, in accordance with one or more embodiments described herein.

The technology described herein generally relates to reallocating power among a group of devices in a situation in which no power headroom remains available to redistribute to devices. As will be understood, this is accomplished by withdrawing power from lower priority devices and increasing the power to higher priority devices, e.g., so that the higher priority workloads are not compromised.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to a system and method to distribute available power to devices in a group. A group of devices, such as a rack of servers in a data center, can have a group power consumption limit, such as the limit of a power distribution unit that supplies power to the group. The group of devices can each report their individual power consumption to a manager, and the manager can combine the individual power consumptions. The manager can compare the combined power consumption of the group to the group power consumption limit to determine a power headroom. The manager can determine power consumption limits for the devices of the group based on the power headroom, the individual power consumptions, and device priority information.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The subject application generally relates to managing device power consumption, such as the power consumption of computing devices in data centers.

FIG. 1 illustrates an example group of devices and a power management console configured to manage power consumption of the devices, in accordance with one or more embodiments described herein. FIG. 1 includes power distribution unit (PDU) 110, device group 100, and power management console 120. The group 100 includes device 101, device 102, and device 103. Device 101 includes local manager 101A, individual power consumption (IPC) 101B, and power limit 101C. Device 102 includes local manager 102A, individual power consumption (IPC) 102B, and power limit 102C. Device 103 includes local manager 103A, individual power consumption (IPC) 103B, and power limit 103C. The power management console 120 includes a group power manager 122.

In an example according to FIG. 1, the local managers 101A, 102A, 103A at the devices 101, 102, 103 can be configured to report IPCs 101B, 102B, 103B to the group power manager 122. The group power manager 122 can be configured to use the IPCs 101B, 102B, 103B, the group power limit 115, and optionally additional information as described herein, to determine power limits 101C, 102C, 103C for the devices 101, 102, 103. The group power manager 122 can provide the power limits 101C, 102C, 103C to the devices 101, 102, 103, and the local managers 101A, 102A, 103A can enforce the power limits 101C, 102C, 103C at the devices 101, 102, 103.

The reporting of IPCs 101B, 102B, 103B by the devices 101, 102, 103, and the calculation of power limits 101C, 102C. 103C by the group power manager 122 can be performed repetitively on an ongoing basis, so that new power limits 101C, 102C, 103C are intermittently re-established for the devices 101, 102, 103 based on updated IPCs 101B, 102B, 103B and any other updated information used by the group power manager 122 to calculate the power limits 101C, 102C, 103C.

In an example embodiment, the devices 101, 102, 103 can comprise server computing devices, such as blade servers that are physically located in a rack of servers within a data center. The group 100 can include, e.g., up to all of the server devices in the rack. The local managers 101A, 102A, 103A can comprise "itrack" type local power management components, optionally modified to implement aspects of this disclosure. The PDU 110 can comprise a PDU that supplies power to the devices 101, 102, 103 of the group 100 via connections 111, 112, and 113. A maximum power output of the PDU 110 can be used as the group power limit 115. The power management console 120 can comprise a power management console (PMC) which is modified to include the group power manager 122 configured according to this disclosure.

In other example embodiments, the group 100 can include any logical or physical group of devices. The group 100 comprises three example devices 101, 102, 103; however other groups can include more or fewer devices. The devices 101, 102, 103 can all be a same type of device, such as a server device, or the devices 101, 102, 103 can comprise devices of different types. The group power limit 115 need not be a limit associated with the PDU 100, but can instead comprise, e.g. a legally or voluntarily imposed group power limit, or a limit associated with a different component other than the PDU 110.

The group power limit 115 can be obtained by the power management console 120 for use by the group power manager 122. In some embodiments, the power management console 120 can optionally receive the group power limit 115 directly from the PDU 110, or group power limit 115 information can be manually supplied to the power management console 120, or the power management console 120 can calculate the group power limit 115 based on PDU 110 type information or measurements.

The IPCs 101B, 102B, 103B can also be obtained by the power management console 120 for use by the group power manager 122. In some embodiments, the respective local managers 101A, 102A, 103A can be configured to report respective IPCs 101B, 102B, 103B to the group power manager 122. Reporting IPCs 101B, 102B, 103B can optionally be in response to requests from the group power manager 122. Alternatively, IPCs 101B, 102B, 103B can be manually supplied to the power management console 120, IPCs 101B, 102B, 103B can be stored at a storage location accessible by the power management console 120, or the power management console 120 can calculate the IPCs 101B, 102B, 103B based on measurements at connections 111, 112, 113.

The IPCs 101B, 102B, 103B can comprise measurements of present power consumption by each of the devices 101, 102, and 103. For example, an IPC 101B can comprise an instantaneous "snapshot" of a present power consumption by device 101, or for example, an IPC 101B can comprise an average power consumption of a device 101 over a sliding time window which immediately precedes a present time. In some embodiments, the respective local managers 101A, 102A, and 103A can be configured to measure the respective IPCs 101B, 102B, 103B, or otherwise obtain IPC information at devices 101, 102, 103. The respective local managers 101A, 102A, and 103A can be configured to report the respective IPCs 101B, 102B, 103B to the group power manager 122. The reporting of IPCs 101B, 102B, 103B can take place at multiple different times, e.g., according to a periodic interval, or in response to requests from the group power manager 122, or both.

The group power manager 122 can optionally obtain, from devices 101, 102, 103, additional information (in addition to IPCs 101B, 102B, 103B) for use in calculating power limits 101C, 102C, 103C for the devices 101, 102, 103. For example, the group power manager 122 can optionally obtain device priority class information from each of the devices 101, 102, 103, and the priority class information can be used in connection with determining power limits 101C, 102C, 103C, in accordance with the teachings herein. Device priority class information can optionally be reported to the group power manager 122 by devices 101, 102, 103 along with the IPCs 101B, 102B, 103B, or device priority class information can be provided to the group power manager 122 manually or by any other channel as appropriate for particular embodiments.

The group power manager 122 can be configured to use IPCs 101B, 102B, 103B, the group power limit 115 and other information such as device priority class information, to determine respective power limits 101C, 102C, 103C for the respective devices. A detailed discussion of an example group power manager is provided in connection with FIG. 2.

The group power manager 122 can operate repetitively, e.g., at multiple different periodic or non-periodic time intervals, by obtaining, at each interval, updated IPCs 101B, 102B, 103B, and by recalculating power limits 101C, 102C, 103C based on the updated IPCs 101B, 102B, 103B. The group power manager 122 can provide updated power limits 101C, 102C, 103C to the devices 101, 102, 103 for enforcement of the updated power limits 101C, 102C, 103C at the devices 101, 102, 103.

The respective local managers 101A, 102A, 103A can be configured to receive respective power limits 101C, 102C, 103C from the group power manager 122, and to enforce the respective power limits 101C, 102C, 103C at the respective devices 101, 102, and 103.

Figure 2:
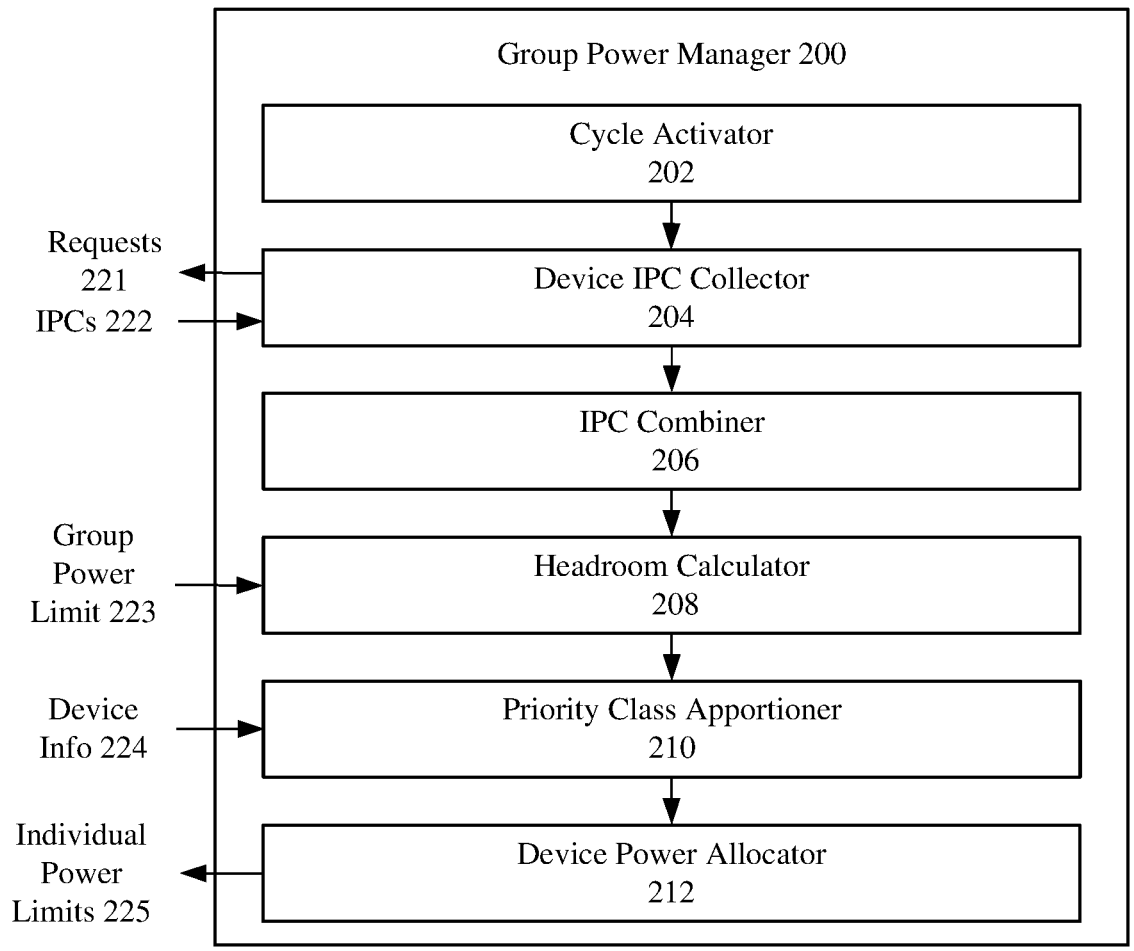
FIG. 2 illustrates an example group power manager which can be deployed in a power management console to manage power consumption of devices, in accordance with one or more embodiments described herein.

FIG. 2 illustrates an example group power manager which can be deployed in a power management console to manage power consumption of devices, in accordance with one or more embodiments described herein. The example group power manager 200 can implement the group power manager 122 introduced in FIG. 1. The example group power manager 200 includes a cycle activator 202, a device IPC collector 204, an IPC combiner 206, a headroom calculator 208, a priority class apportioner 210, and a device power allocator 212.

Example operations according to FIG. 2 can include, e.g., periodically activating a cycle by cycle activator 202. Each cycle can include operations of each of device IPC collector 204, IPC combiner 206, headroom calculator 208, priority class apportioner 210, and device power allocator 212. The device IPC collector 204 can be configured to optionally send requests 221 to devices, e.g., the devices 101, 102, 103 illustrated in FIG. 1. The device IPC collector 204 can receive IPCs 222 in response to the requests 221. The IPCs 222 can include, e.g., IPCs 101B, 102B, 103B illustrated in FIG. 1. The IPC combiner 206 can combine the power consumption values included in IPCs 222, e.g., by adding the IPC values of all devices in a group 100. The IPC combiner 206 can thereby calculate a group power consumption of devices, e.g., 101, 102, 103, in a group 100.

The headroom calculator 208 can be configured to use a group power limit 223, e.g., the group power limit 115 introduced in FIG. 1, along with the group power consumption determined by the IPC combiner 206, to calculate a power headroom. For example, the headroom calculator 208 can subtract the group power consumption from the group power limit 223 in order to calculate power headroom as the difference between the group power consumption and the group power limit 223.

The priority class apportioner 210 can be configured to calculate portions of the power headroom determined by headroom calculator 208, wherein the portions are for assignment to different device priority classes. For example, device info 224 can include priority class assignments of each device 101, 102, 103 in a group 100. The priority class apportioner 210 can use priority class assignment information, optionally along with other information as described herein, to determine portions of the power headroom to be assigned to each priority class. Resulting calculated portions of the power headroom can optionally be used as adjustment values to adjust the total power portions available each priority class.

The device power allocator 212 can be configured to determine power allocations for each device 101, 102, 103. In an embodiment, the device power allocator 212 can allocate each respective portion determined by the priority class apportioner 201 to the devices in the respective priority class corresponding to the respective portion. Thus for example if devices 101 and 102 are in a first priority class, the device power allocator 212 can allocate the portion for the first priority class among devices 101 and 102. In some embodiments, the device power allocator 212 can use the IPCs of the devices to determine allocations among the devices in a priority class. The device power allocator 212 can determine individual power limits 225 based its allocations. The individual power limits 225 can comprise, e.g., the power limits 101C, 102C, 103C. The group power manager 200 can send the individual power limits 225 to the devices.

Unlike static power capping, dynamic capping according to this disclosure can adjust the capping values, i.e., the individual power limits 225, of each device in a group based on the power demand of the device and the total power available to the group. Dynamic capping's responsive distribution of power helps to minimize negative performance impacts due to power capping, while ensuring that overall power consumption of the group never exceeds available power.

Embodiments of this disclosure can overcome the limitations of static power capping by dynamically capping the power of devices based on a defined policy. The considerations in power capping policy can include, but are not limited to: 1. Scope, i.e., the set of devices on which a policy is to be applied, which can range from all devices in a data center to devices in a specific rack to any arbitrary group of devices. 2. Device priority classes, i.e., the relative importance of devices in a group, which can influence the extent to which device power is capped. There can be multiple levels of priority. In one example, described further below, three levels of priority (High, Medium, Low) are considered as examples. 3. Relative priority weights, i.e., weights used to configure a ratio of power distributed among the different priority classes. 4. Minimum power needed by devices, i.e. a lower bound of the device power consumption. 5. Maximum power consumed by a device, i.e., an upper bound of device power consumption. 6. Total available power, i.e., the group power limit 223 which defines the total power available for the scope of the policy. This should be equal to or greater than the sum of the minimum power needed by the devices.

Power management can be done based on power availability specified in a policy, which should not be less than the cumulative lower bounds of the applicable devices. Power management can use a nonintrusive method and can be based on a non-trivial weighted priority technique. Weighted priority can involve calculations that consider the varying degrees of importance of multiple classes of devices in a group.

At each sampling interval, power consumption data from each device can be collected. Available power headroom can be computed. Capping values of each device can be adjusted to allocate the available power considering the priority class of the device and its current consumption. The group power manager 200 can raise the power caps of individual devices that are busier and need more power, while lowering the caps for the devices that are consuming less power, and while also ensuring that the overall power consumption never goes above the total available power. This will balance the group capping and will optimize the use of power among the devices in the group.

In an example embodiment, the class apportioner 210 can apply the below calculation to determine portions of power for each priority class:

$$Vpc = \frac{(V * Pi * Wi)}{\sum_{i=1}^{N}(Pi * Wi)}$$

In the above example calculation, Vpc is the consolidated power cap to be allocated amongst devices within a given priority class pc. Vpc thus defines a portion of available power to be allocated amongst devices in a priority class. Vpc can be calculated as a function of V, Pi, Wi and N, wherein V is a power availability for the devices in a reactive dynamic power policy, that is, a power headroom for a reactive dynamic power policy; Pi is a population in a priority class i (in this example, a number of devices in the priority class i); Wi is a weighted priority for the priority class i, and N is the total number of priority classes. The weighted priority Wi can be a fixed value for each priority class, or can be adjusted if priorities change.

After determinations of the portions of power for each priority class, the device power allocator 212 can allocate the Vpc portions designated for each priority class among the devices within each priority class. The device power allocator 212 can perform a power cap adjustment amongst the devices within the same priority class based on individual device power consumption and the consolidated power caps Vpc. In an example embodiment, the device power allocator 212 can apply the below calculation to determine allocations of power to each device:

$$Vd = \frac{Vpc}{Tpc} * Cd$$

In the above example calculation, Vd is the power cap to be allocated to each device d. e.g., Vd is can be a power limit such as 101C, 102C, or 103C, illustrated in FIG. 1. Vd can be calculated as a function of Vpc, Tpc, and Cd, wherein Vpc is the consolidated power cap to be adjusted amongst devices within a priority class pc which includes the device d. Tpc is the total combined power consumption of the devices in priority class pc, and Cd is the power consumption of the device d. e.g., an IPC such as 101B, 102B, or 103B.

In some embodiments, the priority class apportioner 210 and device power allocator 212 can apply additional rules in order to make determinations regarding individual power limits 225. The additional rules can include, e.g., a rule that disallows an individual power limit to fall below a minimum power needed by a device, and adjusts individual power limits as needed to prevent such an occurrence; a rule that disallows an individual power limit to exceed a maximum power of a device; and a rule that specifies an action to take in the event of no available power headroom, for example, in such event devices can remain capped at current levels.

Furthermore, if a policy is updated to either change the weighted priorities of the priority classes, or, increase the group power limit resulting in additional power headroom, embodiments can be configured to responsively recalculate the individual power limits 225 according to the techniques described herein.

Figure 3:
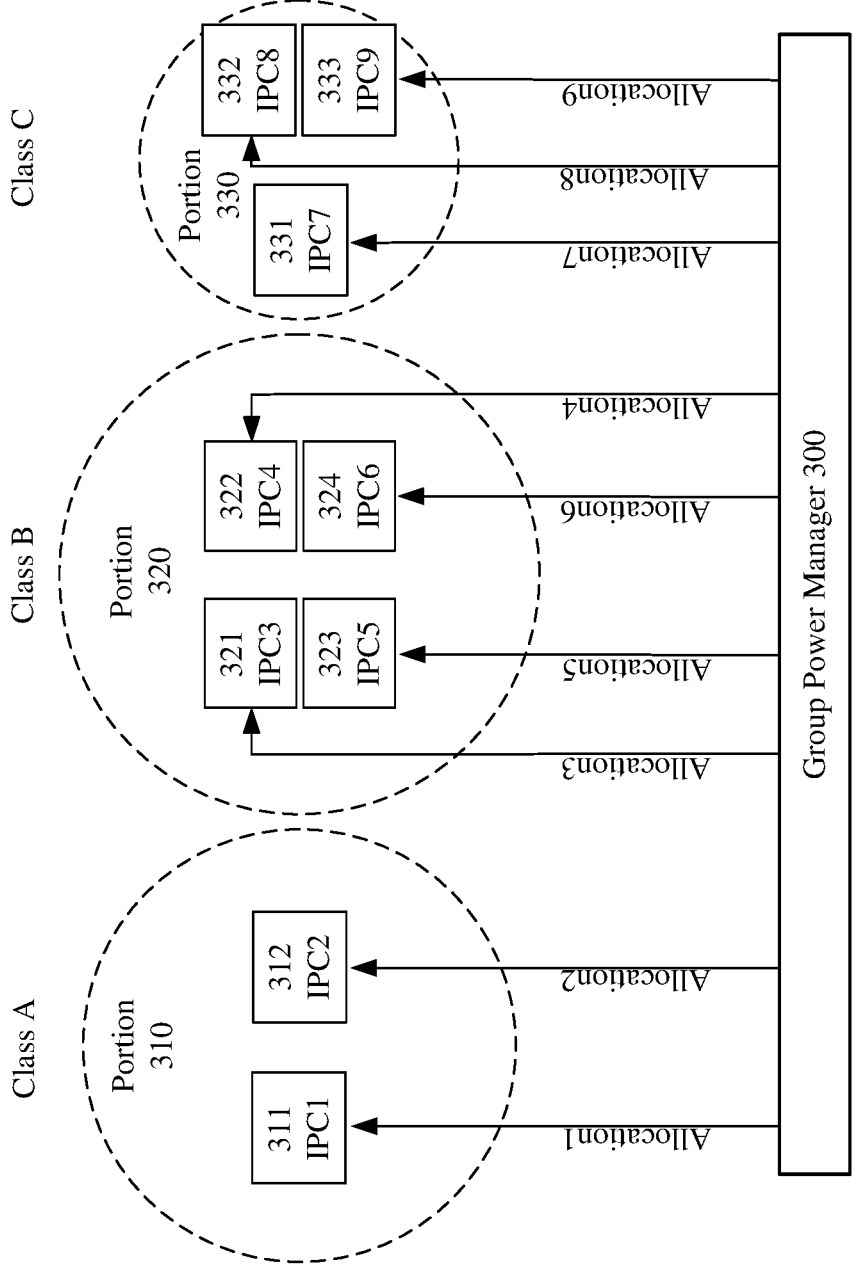
FIG. 3 illustrates example devices of different priority classes, portions of available power assigned to the different priority classes, and allocations of the portions of available power among the devices of the different priority classes, in accordance with one or more embodiments described herein.

FIG. 3 illustrates example devices of different priority classes, portions of available power assigned to the different priority classes, and allocations of the portions of available power among the devices of the different priority classes, in accordance with one or more embodiments described herein. FIG. 3 includes a group power manager 300, which can implement, e.g., the group power manager 200 introduced in FIG. 2, or the group power manager 122 introduced in FIG. 1.

FIG. 3 furthermore illustrates example devices, including devices 311, 312, 321, 322, 323, 324, 331, 332 and 333. The devices 311, 312, 321, 322, 323, 324, 331, 332 and 333 are each associated with an individual power consumption (IPC): device 311 is associated with IPC1, device 312 is associated with IPC2, device 321 is associated with IPC3, device 322 is associated with IPC4, device 323 is associated with IPC5, device 324 is associated with IPC6, device 331 is associated with IPC7, device 332 is associated with IPC8, and device 333 is associated with IPC9.

The devices 311, 312, 321, 322, 323, 324, 331, 332 and 333 can be included in a group of devices having power limits that are managed by the group power manager 300. The group power manager 300 can provide allocations to the devices 311, 312, 321, 322, 323, 324, 331, 332 and 333, wherein each allocation can designate a power limit to be applied at a device. In FIG. 3, the group power manager 300 provides allocation1 to device 311, allocation2 to device 312, allocation3 to device 321, allocation4 to device 322, allocation5 to device 325, allocation6 to device 324, allocation7 to device 331, allocation8 to device 332, and allocation9 to device 333.

The devices 311, 312, 321, 322, 323, 324, 331, 332 and 333 are divided into different priority classes, including class A, class B, and class C. Devices 311 and 312 are in class A, devices 321, 322, 323 and 324 are in class B, and devices 331, 332 and 333 are in class C.

In order to determine the allocations, the group power manager 300 can first determine portions for each priority class, and then allocate the portions among the devices in the priority class. For example, in FIG. 3, the group power manager 300 has determined portion 310 for class A, portion 320 for class B, and portion 330 for class C. The group power manager 300 has then allocated portion 310 among devices 311 and 312, allocated portion 320 among devices 321, 322, 323, and 324, and allocated portion 330 among devices 331, 332, and 333.

The determination of portions 310, 320, and 330 can be based on information such as the group power limit, the combined power consumption of devices 311, 312, 321, 322, 323, 324, 331, 332 and 333 (i.e. the sum of IPC1, IPC2, IPC3, IPC4, IPC5, IPC6, IPC7, IPC8, and IPC9), the power headroom (which can be calculated as the difference between the group power limit and the combined power consumption), the weighted priorities of the classes, the population in each class, and the number of classes, e.g., as described above with reference to FIG. 2.

The determination of the allocations within a portion, such allocation1 and allocation2, within portion 310, can be based on information such as the size of the portion 310, the total consumption of devices 311 and 312 within the priority class corresponding to the portion 310, and the individual power consumption IPC1 or IPC2 of a device for which the allocation (allocation1 or allocation2) is being determined, e.g., as described above with reference to FIG. 2.

Figure 4:
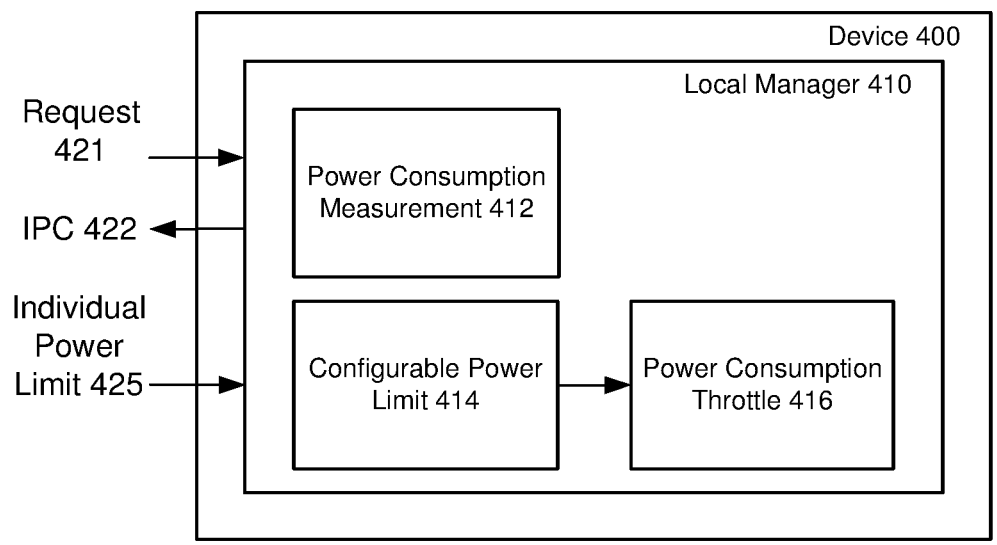
FIG. 4 illustrates an example device equipped with a local manager configured to report device power consumption and receive and enforce a configurable power limit for the device, in accordance with one or more embodiments described herein.

FIG. 4 illustrates an example device equipped with a local manager configured to report device power consumption and receive and enforce a configurable power limit for the device, in accordance with one or more embodiments described herein. The example device 400 can implement, e.g., any of devices 101, 102, or 103, illustrated in FIG. 1, or any of devices 311, 312, 321, 322, 323, 324, 331, 332 and 333 illustrated in FIG. 3. The device 400 includes a local manager 410. Local manager 410 can implement any of the local managers 101A, 102A, or 103A illustrated in FIG. 1. The local manager 410 includes power consumption measurement 412, configurable power limit 414, and power consumption throttle 416.

Example operations according to FIG. 4 can include receiving a request 421 at the local manager 410. The request 421 can include, e.g. a request among requests 221 introduced in FIG. 2. In response to the request 421, the local manager 410 can activate power consumption measurement 412 to measure the individual power consumption at the device 400, resulting in IPC 422. The local manager 410 can send IPC 422 for use by a group power manager to calculate a power limit, such as individual power limit 425, for the device 400. Upon receiving individual power limit 425, the local manager 410 can store use the individual power limit 425 as the limit for configurable power limit 414. The power consumption throttle 416 can be configured to throttle device 400 power consumption so as not to exceed the configurable power limit 414.

FIG. 5 is a table showing example individual power consumptions of devices at different time intervals, and example power limits assigned to the devices for the time intervals, wherein the power limits can be based on the individual power consumptions and other data, in accordance with one or more embodiments described herein. FIG. 5 includes a device 1 row, a device 2 row, a device 3 row, a device 4 row, a device 5 row, a group row, and a headroom row. FIG. 5 further includes an interval 1 column divided into a limit 1 column and an IPC1 column, an interval 2 column divided into a limit 2 column and an IPC2 column, and an interval 3 column divided into a limit 3 column and an IPC3 column.

In general, with reference to FIG. 5, a group power manager such as group power manager 122 can initially receive device IPC1 values, such as 250 Watts (W) for device 1, 350 W for device 2, 300 W for device 3, 200 W for device 4 and 200 W for device 5. The group power manager 122 can combine the device IPC1 values to calculate the combined power consumption for the group as 1300 W. Using an example group power limit of 2000 W, the group power manager 122 can determine the resulting power headroom is 700 W. The group power manager 122 can then determine individual power limits for the devices using the techniques described herein, resulting in the limit values in the limit 2 column. The group power manager 122 can provide the limit 2 values to the respective devices (devices 1-5), and the devices can continue to operate while restricting their power consumption based on their respective limit 2 power limits.

At some subsequent time, e.g., toward the end of interval 2, the group power manager 122 can receive device IPC2 values, such as 400 W for device 1, 500 W for device 2, 427 W for device 3, 200 W for device 4 and 173 W for device 5. The group power manager 122 can combine the device IPC2 values to calculate the combined power consumption for the group as 1700 W. The group power manager 122 can determine the resulting power headroom is 300 W. The group power manager 122 can then determine individual power limits for the devices using the techniques described herein, resulting in the limit values in the limit 3 column. The group power manager 122 can provide the limit 3 values to the respective devices, and the devices can continue to operate while restricting their power consumption based on their respective limit 3 power limits. At some subsequent time, e.g., toward the end of interval 3, the group power manager 122 can receive device IPC3 values, and the above described process can be repeated again and further repeated indefinitely as described above.

In an example embodiment, FIG. 5 demonstrates how power limits can be adjusted after each sampling interval. Power limits of each device can be calculated at each interval based on the power demand from the previous interval, and the power limits can be dynamically adjusted as needed. While adjusting the power limit (capping) values on each device, the group power manager 122 can maintain the total power consumption of the group within the group capping ceiling (here, 2000 W). If the combined power consumption reaches the budget group power limit, as in the IPC3 column, the group power manager 122 can optionally retain the power limits from the previous interval.

FIG. 5 also displays the excess power, or power headroom, as the difference between the combined power usage and the group power consumption values. Excess power can be dynamically distributed among the devices in the group based on the priority of each device as well on the power consumption values, with the higher-priority devices with more power consumption receiving more power.

At interval 1, the excess power of the group is 700 W. At interval 2, the power caps are adjusted accordingly. For example, if device 1 and device 2 are higher priority, they can be allocated relatively larger percentage increases of their previous measured power consumption, while if device 3 and device 4 are lower priority, they can be allocated relatively smaller percentage increases of their previous measured power consumption.

In an example application of the power determinations according to this disclosure, which can be understood by reference to FIG. 5, consider a group of five devices, D1, D2, D3, D4, and D5. The devices are divided into three priority classes, high, medium, and low. Devices D1 and D2 are high priority, devices D3 and D4 are medium priority, and device D5 is low priority. The priority weights are 3 for high, 2 for medium, and 1 for low. The group power limit is 2000 W.

At a first time T1, the power headroom is measured at 700 W. In order to determine power limits for the devices, first, the equation set forth above for use by the priority class apportioner 210 can be applied to determine portions of power for each priority class, as follows:

Portion for high priority class=(700*3*2)/(3*2+2*2+1*1)=382 W (Approx.) Portion for medium priority class=(700*2*2)/(3*2+2*2+1*1)=255 W (Approx.) Portion for low priority class=(700*1*1)/(3*2+2*2+1*1)=64 W (Approx.)

Next, the equation set forth above for use by the device power allocator 212 can be applied to determine adjustments to the power consumption limits of each device, as follows:

Power cap adjustment for D1=(382/600)*250=159 W (Approx.)

Power cap adjustment for D2=(382/600)*350=223 W (Approx.)

Power cap adjustment for D3=(255/500)*300=153 W (Approx.)

Power cap adjustment for D4=(255/500)*200=102 W (Approx.)

Power cap adjustment for D5=(64/200)*200=64 W (Approx.).

The above calculated adjustment values can be combined with the measured power consumptions of each device to determine new allocations/power limits for each device. FIG. 5 shows (approximately) the result of application of the above adjustment values to calculate the power limits in the limit 2 column.

At a second time T2, the power headroom is measured at 300 W. In order to determine new power limits for the devices, first, the equation set forth above for use by the priority class apportioner 210 can again be applied to determine portions of power for each priority class, as follows:

Portion for high priority class=(300*3*2)/(3*2+2*2+1*1)=164 W (Approx.) Portion for medium priority class=(300*2*2)/(3*2+2*2+1*1)=109 W (Approx.) Portion for low priority class=(300*1*1)/(3*2+2*2+1*1)=27 W (Approx.)

Next, the equation set forth above for use by the device power allocator 212 can again be applied to determine adjustments to the power consumption limits of each device, as follows:

Power cap adjustment for D1=(164/900)*400=73 W (Approx.)

Power cap adjustment for D2=(164/900)*500=91 W (Approx.)

Power cap adjustment for D3=(109/627)*427=74 W (Approx.)

Power cap adjustment for D4=(109/627)*200=35 W (Approx.)

Power cap adjustment for D5=(27/173)*173=27 W (Approx.).

The above calculated adjustment values can be again be combined with the measured power consumptions of each device (this time, the values in the IPC2 column) to determine new allocations/power limits for each device. FIG. 5 shows (approximately) the result of application of the above adjustment values to calculate the power limits in the limit 3 column.

Figure 6:
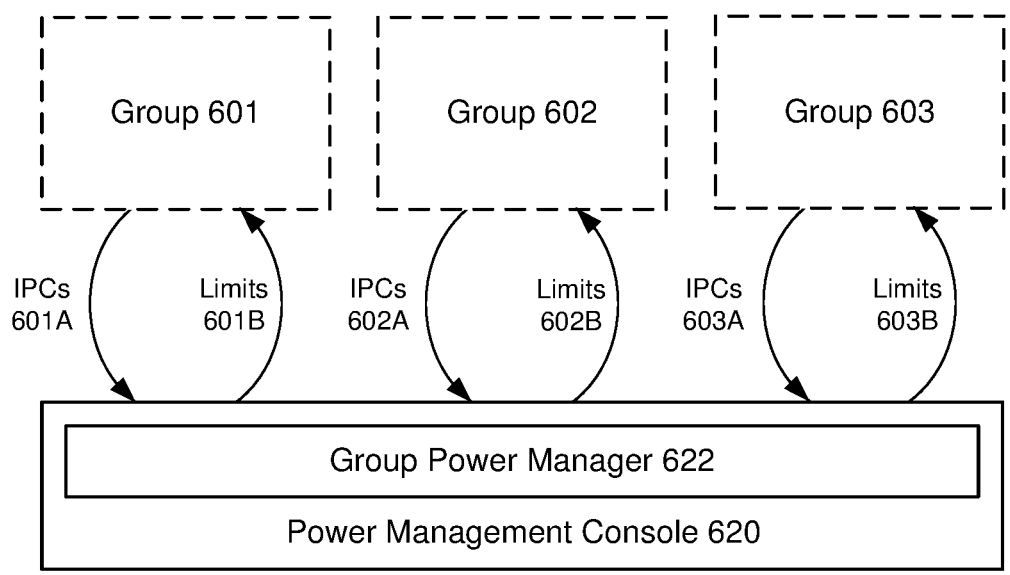
FIG. 6 illustrates an example power management console equipped with a group power manager configured to manage multiple different groups of devices, in accordance with one or more embodiments described herein.

FIG. 6 illustrates an example power management console equipped with a group power manager configured to manage multiple different groups of devices, in accordance with one or more embodiments described herein. The example power management console 620 includes a group power manager 622, and the power management console 620 and group power manager 622 can implement the power management console 120 and group power manager 122 introduced in FIG. 1. FIG. 6 furthermore illustrates group 601, group 602, and group 603. Each of the groups 601, 602, 603 can comprise a group of devices, similar to the group 100 illustrated in FIG. 1. For example, each of the groups 601, 602, 603 can optionally comprise a different rack of server devices in a data center. The groups 601, 602, 603 can optionally contain different numbers of devices, different types of devices, different numbers of priority classes, and/or different group power limits.

FIG. 6 illustrates management of multiple different groups 601, 602, 603 by the group power manager 622. Each group can provide IPC information to the group power manager 622, and the group power manager 622 can use optionally different group power limit information and device priority class information applicable to each to each group 601, 602, or 603 to determine power limits for devices in the group 601, 602, or 603. For example, the group power manager 622 can receive IPCs 601A from the devices of group 601, and the group power manager 622 can determine limits 601B for the devices of group 601. The group power manager 622 can receive IPCs 602A from the devices of group 602, and the group power manager 622 can determine limits 602B for the devices of group 602. The group power manager 622 can receive IPCs 603A from the devices of group 603, and the group power manager 622 can determine limits 603B for the devices of group 603. The group power manager 622 can repeat determinations of limits 601B, 602B, and 603B optionally according to different schedules for the different groups 601, 602, 603.

As set forth herein, there can be a significant issue when, at time T4, the available power headroom for power capacity distribution among the group of devices has reached an available power capacity distribution lower limit. In the example of FIG. 5, as shown by the bolded entry in the lower right corner of the table, the lower limit is reached at zero watts (0 W), that is, there is zero (or substantially zero) power headroom capacity remaining to reallocate. As set forth above, this can have adverse implications, such as with respect to service level agreements.

In such a lower limit (e.g., zero headroom) scenario, described herein is a technology that operates to further reallocate power capacity among groups of devices based on their respective priority classes/levels. In other words, given the above-described considerations of scope, priority classes of the devices, relative weightages of priority, minimum power needed by a device, maximum power consumed by a device and total available power, described herein is recalibrating power capacity of high priority devices without increasing the power capacity of the dynamic policy until the limit is reached. As will be seen, this recalibration is accomplished by withdrawing power from the lower priority devices and allocating the withdrawn power to the higher priority devices.

In one implementation, the reallocation can be based on a minimum positive value (the minimum power required by the system to run optimally), which can be a percentage (e.g., ten percent) of the power cap of high priority device class when the headroom is zero (or at some other defined lower limit). Note that ten percent has been found to work sufficiently well given a sampling interval on the order of five seconds. Further, the power capacity of lower (e.g., medium and low priority) devices can be based on a defined ration, such as the ratio of 2:1 in each sampling interval until the following (base value) limit is reached. The limit is reached when the power capacity of medium and low priority device classes has reached the base value derived as described herein, with the consideration of total power capacity of the dynamic policy.

Once the limit is reached and there is still no power headroom available, an alert to the user can be output to increase the power capacity, e.g., stating that power consumption has reached the maximum possibility of automatic re-adjustment and needs to be increased to provide correct operation. Based on this alert, user can take appropriate mitigating action (for example, to increase the policy cap value).

By way of further example continuing with the operating state shown in FIG. 5 after time T3, to reiterate, the number of devices in the group (G1) is five, there are three classes with weighted priorities of high=3, medium=2, low=1, there are two high weighted priority devices s1 and s2, two medium weighted priority devices s3 and s4, and one low weighted priority device s5. The power capacity for the dynamic policy equals 2000 watts.

FIG. 7 shows how the power capacity is reallocated at time T4 when no power headroom is available as described herein. Note that prior to the reallocation at time T4, the sum of power allocated to priority class 1 (devices S1 and S2) is 473 W+591 W=1064 W. Further, from the above calculation $$Vpc = \frac{(V * Pi * Wi)}{\sum_{i=1}^{N}(Pi * Wi)};$$

Minimum base power capacity of High priority device class=(2000*3*2)/(3*2+2*2+1*1)=1091 W (Approx.)
Minimum base power capacity of Medium priority device class=(2000*2*2)/(3*2+2*2+1*1)=727 W (Approx.)
Minimum base power capacity of Lower priority device class=(2000*1*1)/(3*2+2*2+1*1)=181 W (Approx.).
Based on the above values, the re-adjustment (increment) of power cap for high priority device class is the smaller of the two values below, power cap minus currently allocated power or ten percent of currently allocated power, namely 27 W in this example:

[(1091 W−1064 W=27 W) or (1064*10/100)=106.4], which is thus 27 W.

Based on this lesser 27 W value and the ratio described above, the readjustment (decrement) of the power cap for the medium priority device class=2/3*27=−18 w (approx.). The readjustment (decrement) of power cap for low priority device class=1/3*27=−9 w (approx.)

With respect to specific devices, based on the formula $$Vd = \frac{Vpc}{Tpc} * Cd,$$

the total 27 W power cap adjustment (increment) is reallocated for s1=(27/1064)*473=12 w (approx.), and the power cap adjustment (increment) for s2=(27/1064)*591=15 w (approx.). The power cap adjustment (decrement) for s3=−(18/737*502)=−12 w (approx.) and the power cap adjustment (decrement) for s4=−(18/737*235)=−6 w (approx.). Since the lower priority class has only the one device s5, the power cap adjustment (decrement) for s5=−(9/199*199)=−9 w (approx.) This is seen in the rightmost table column in FIG. 7

It should be noted that any reallocation is subject to an override based on a device minimum limit. Thus, for example, the values reach a point where the reallocation would go below a device's minimum, a corrective adjustment can be made, e.g., adjust the 27 W down to 20 W, for example, and then reallocate the 20 W.

To summarize, the technology described herein resolves the problem where there is no power headroom available to distribute any further in a dynamic power for a group. The technology reallocates the power capacity of high priority devices without increasing the power capacity of the dynamic policy until the threshold limit of power capacity of medium and low priority device classes has reached the base value derived as described herein, along with the consideration of total power capacity of the dynamic policy. The re-calibration logic is based on the minimum positive value (the minimum power required by the system to run optimally; and n percent (e.g., 10%) of the power cap of high priority device class when headroom is 0).

Figure 8:
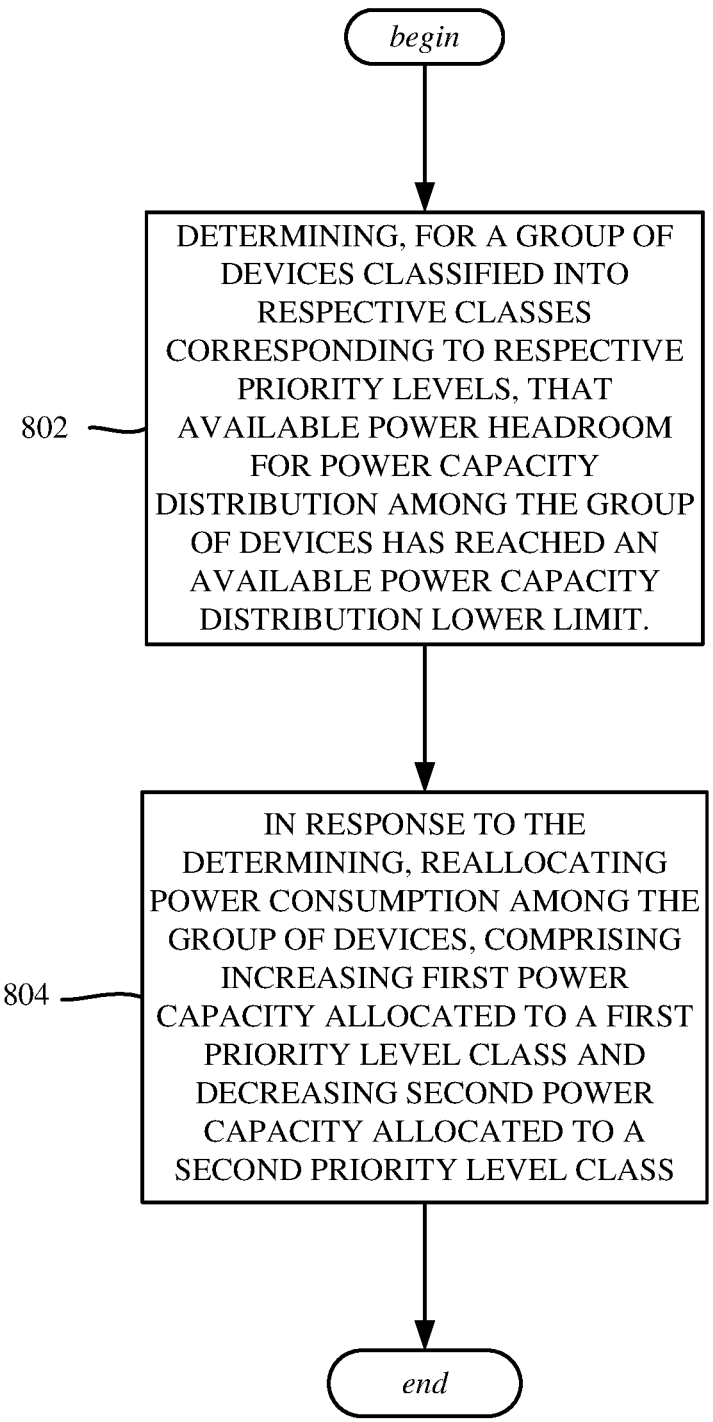
FIG. 8 is a flow diagram of example operations related to reallocating power consumption among a group of devices when available power has reached a lower limit (e.g., zero or substantially zero), in accordance with one or more embodiments described herein.

One or more aspects can be embodied in a system, such as represented in FIG. 8, and for example can comprise a memory that stores computer executable components and/or operations, and a processor that executes computer executable components and/or operations stored in the memory. Example operations can comprise operation 802, which represents determining, for a group of devices classified into respective classes corresponding to respective priority levels, that available power headroom for power capacity distribution among the group of devices has reached an available power capacity distribution lower limit; operation 804 represents, in response to the determining, reallocating power consumption among the group of devices, comprising increasing first power capacity allocated to a first priority level class and decreasing second power capacity allocated to a second priority level class.

The available power capacity distribution lower limit can be zero or substantially zero.

Increasing the first power capacity allocated to the first priority level class can be based on a defined percentage of power capacity allocated to the first priority class prior to the increasing the first power capacity allocated to the first priority level class.

Increasing the first power capacity allocated to the first priority level class can be based on base power capacity determined for the first priority class minus power capacity allocated to the first priority class prior to the increasing the first power capacity allocated to the first priority level class.

Decreasing the second power capacity allocated to the second priority level class can be limited based on a base power level of a device in the second priority level class.

Further operations can comprise decreasing third power capacity allocated to a third priority level class; increasing the first power capacity allocated to the first priority level class can be based on decreasing the second power capacity allocated to the second priority level class and decreasing the third power capacity allocated to the third priority level class. Decreasing the second power capacity allocated to the second priority level class and the decreasing the third power capacity allocated to the third priority level class can be based on a defined ratio.

Reallocating power consumption among the group of devices can comprise a first reallocating operation at a first time, and further operations can comprise reallocating, in a second reallocating operation at a second time that is after the first time, power consumption among the group of devices, which can comprise further increasing the first power capacity allocated to the first priority level class and further decreasing the second power capacity allocated to the second priority level class.

Prior to the reallocating the power consumption, available power headroom can be above the available power capacity distribution lower limit, and further operations can comprise redistributing power consumption among the devices based on the available power headroom at a sampling interval rate, with the available power capacity distribution lower limit reached as a result of a redistribution corresponding to a sampling interval.

The group of devices can correspond to a rack of devices.

The group of devices comprises devices can comprise a datacenter.

Figure 9:
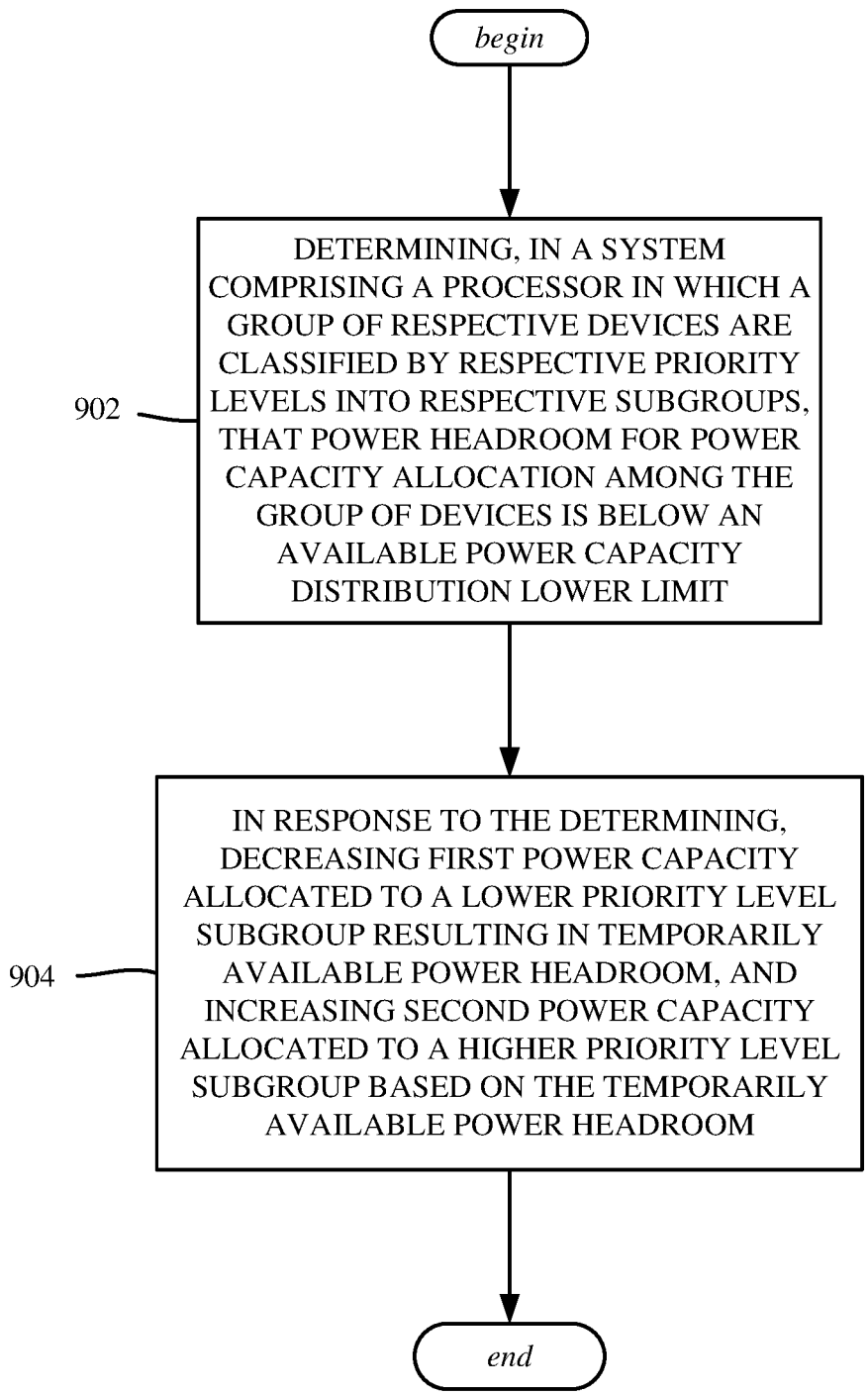
FIG. 9 is a flow diagram of example operations related to decreasing first power capacity allocated to a lower priority level subgroup and increasing second power capacity allocated to a higher priority level subgroup based on the decrease, in accordance with one or more embodiments described herein.

One or more example aspects, such as corresponding to operations of a method, are represented in FIG. 9. Operation 902 represents determining, in a system comprising a processor in which a group of respective devices are classified by respective priority levels into respective subgroups, that power headroom for power capacity allocation among the group of devices is below an available power capacity distribution lower limit. Operation 904 represents, in response to the determining, decreasing first power capacity allocated to a lower priority level subgroup resulting in temporarily available power headroom, and increasing second power capacity allocated to a higher priority level subgroup based on the temporarily available power headroom.

Further operations can comprise determining an increment amount based on the second power capacity allocated to the higher priority level subgroup prior to the increasing the second power capacity allocated to the higher priority level subgroup. Determining the increment amount based on the second power capacity allocated to the higher priority level subgroup prior to the increasing can comprise subtracting the second power capacity allocated to the higher priority level subgroup prior to the increasing, from a base power capacity of the higher priority level subgroup. Determining the increment amount based on the second power capacity allocated to the higher priority level subgroup prior to the increasing can comprise multiplying the second power capacity allocated to the higher priority level subgroup prior to the increasing by a defined percentage.

Decreasing the first power allocated to the lower priority level subgroup is based on a base power capacity of a device of the lower priority level subgroup.

The lower priority level subgroup can be a first lower priority level subgroup, and decreasing the power allocated to the lower priority level subgroup can comprise decreasing the power allocated to the first lower priority level subgroup based on a defined ratio of first lower priority level subgroup to a second lower priority level subgroup.

Figure 10:
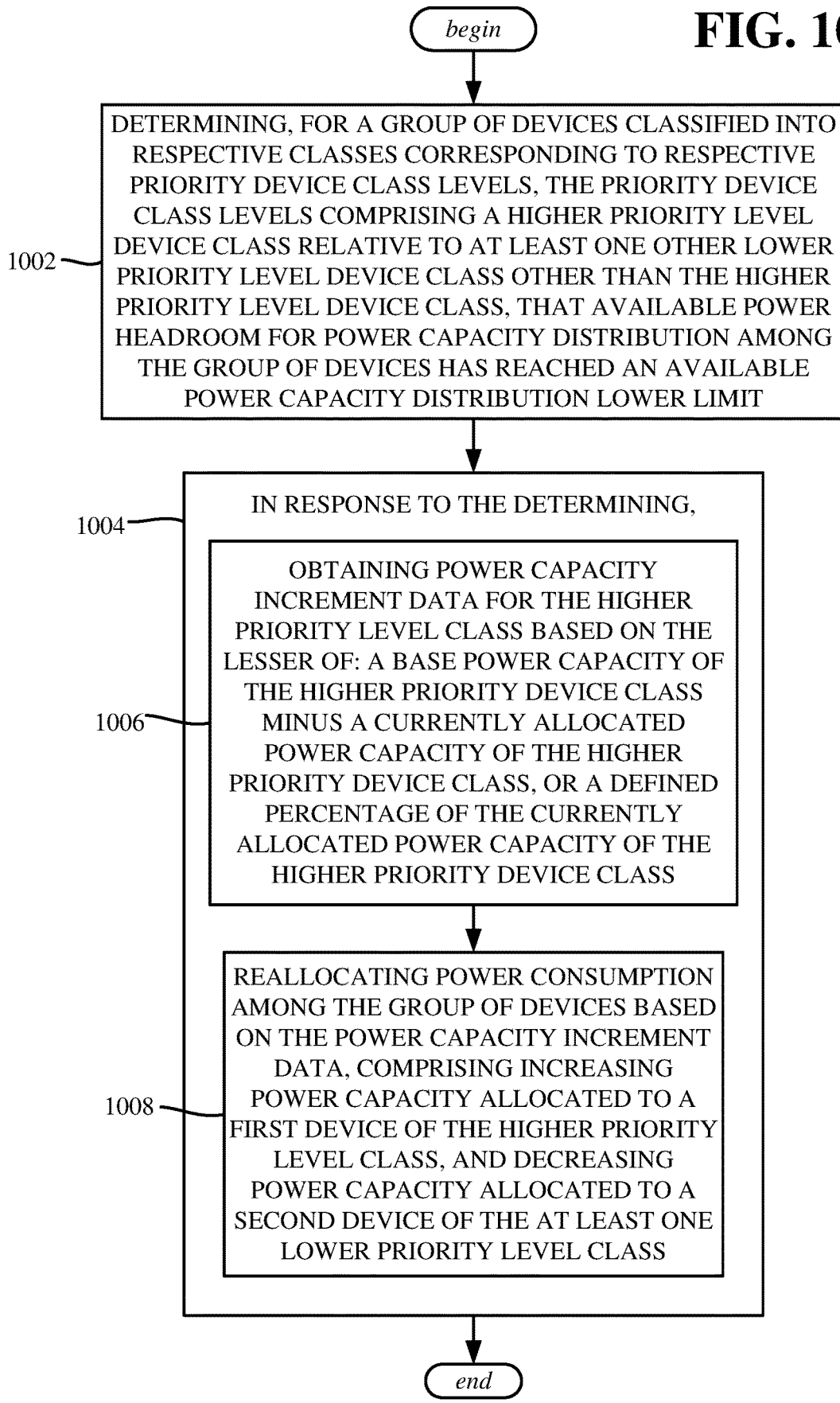
FIG. 10 is a flow diagram of example operations related to reallocating power consumption among a group of devices by increasing power capacity allocated to a first device and decreasing power capacity allocated to a second device, in accordance with one or more embodiments described herein.

FIG. 10 summarizes various example operations, e.g., corresponding to a machine-readable storage medium, comprising executable instructions that, when executed by a processor, facilitate performance of operations. Operation 1002 represents determining, for a group of devices classified into respective classes corresponding to respective priority device class levels, the priority device class levels comprising a higher priority level device class relative to at least one other lower priority level device class other than the higher priority level device class, that available power headroom for power capacity distribution among the group of devices has reached an available power capacity distribution lower limit. Operation 1004 represents, in response to the determining, obtaining power capacity increment data for the higher priority level class based on the lesser of: a base power capacity of the higher priority device class minus a currently allocated power capacity of the higher priority device class, or a defined percentage of the currently allocated power capacity of the higher priority device class (operation 1006), and reallocating power consumption among the group of devices based on the power capacity increment data, comprising increasing power capacity allocated to a first device of the higher priority level class, and decreasing power capacity allocated to a second device of the at least one lower priority level class (operation 1008).

At least one lower priority level class can comprise a first lower priority level class and a second lower priority level class that is below the priority level of the first lower priority level class, the second device can be classified in the second lower priority level class, and decreasing the power capacity allocated to the second device can comprise determining an amount to decrease the power capacity allocated to the second device based on a defined decrement ratio of the first lower priority level class to the second lower priority level class.

Obtaining the power capacity increment data for the higher priority level class can comprise determining a first power capacity increment amount based on the lesser of the base power capacity of the higher priority device class minus the currently allocated power capacity of the higher priority device class, or the defined percentage of the currently allocated power capacity of the higher priority device class, and reducing the first power capacity increment amount based on a base power capacity of the second device to obtain the power capacity increment data.

As can be seen, the technology described herein facilitates keeping priority applications and services largely unaffected, including, for example, during unexpected power demand/load scenarios. This power reallocation and deallocation technology, among a group of systems, can result in lower business loss during unexpected high demand, while remaining within existing limits of overall power consumption. For example, in large datacenters as well in cloud deployments, which consume relatively huge power, along with the consideration of power constraint as a factor for data center operator to increase rack device density, the technology described herein solves the problems of other solutions, e.g., those associated with automatically deriving a safe margin to handle the rarely peak power demand or power source failure, which can lead to considerable power under-utilization as well as implicate performance losses.

Figure 11:
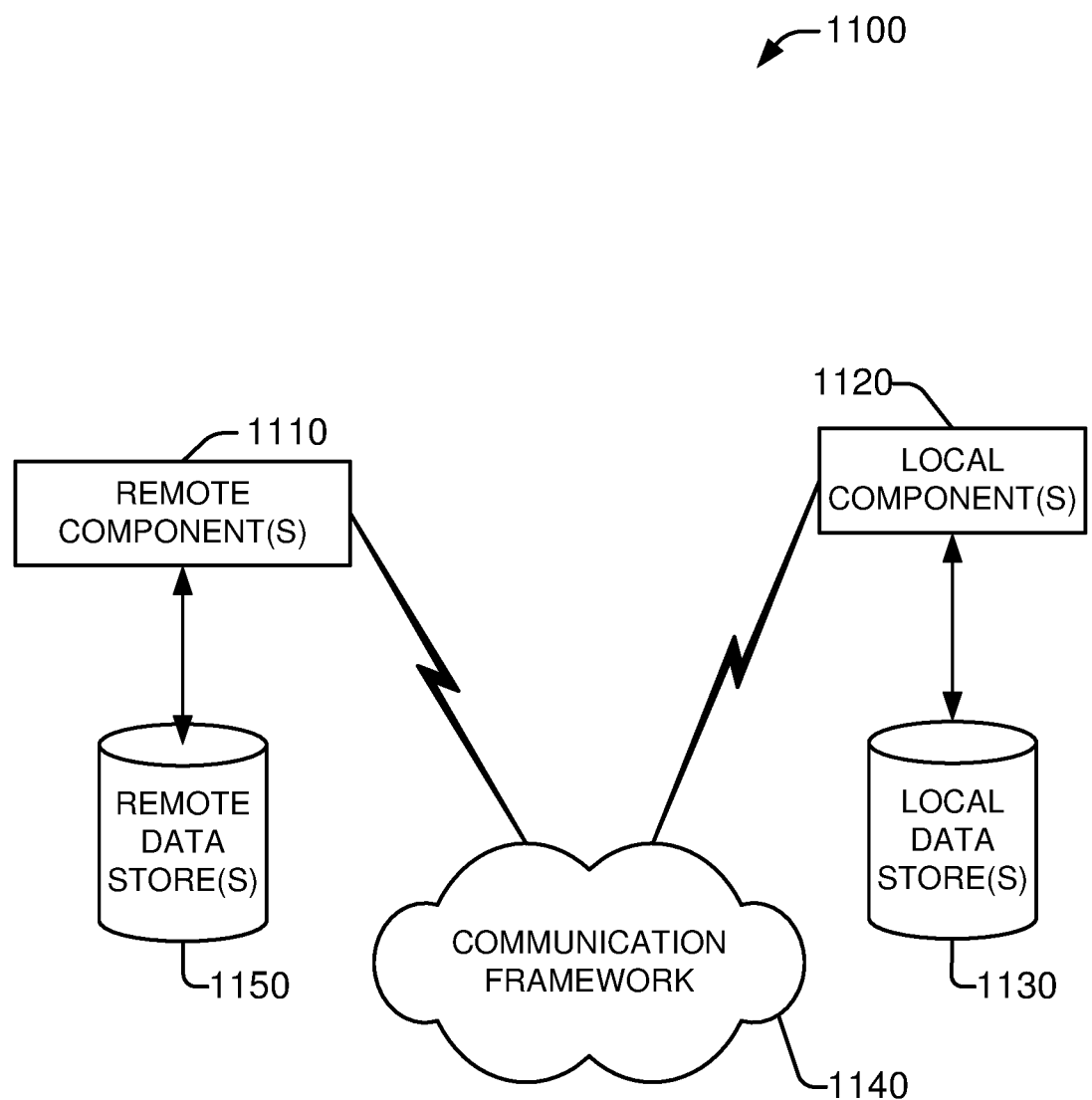
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
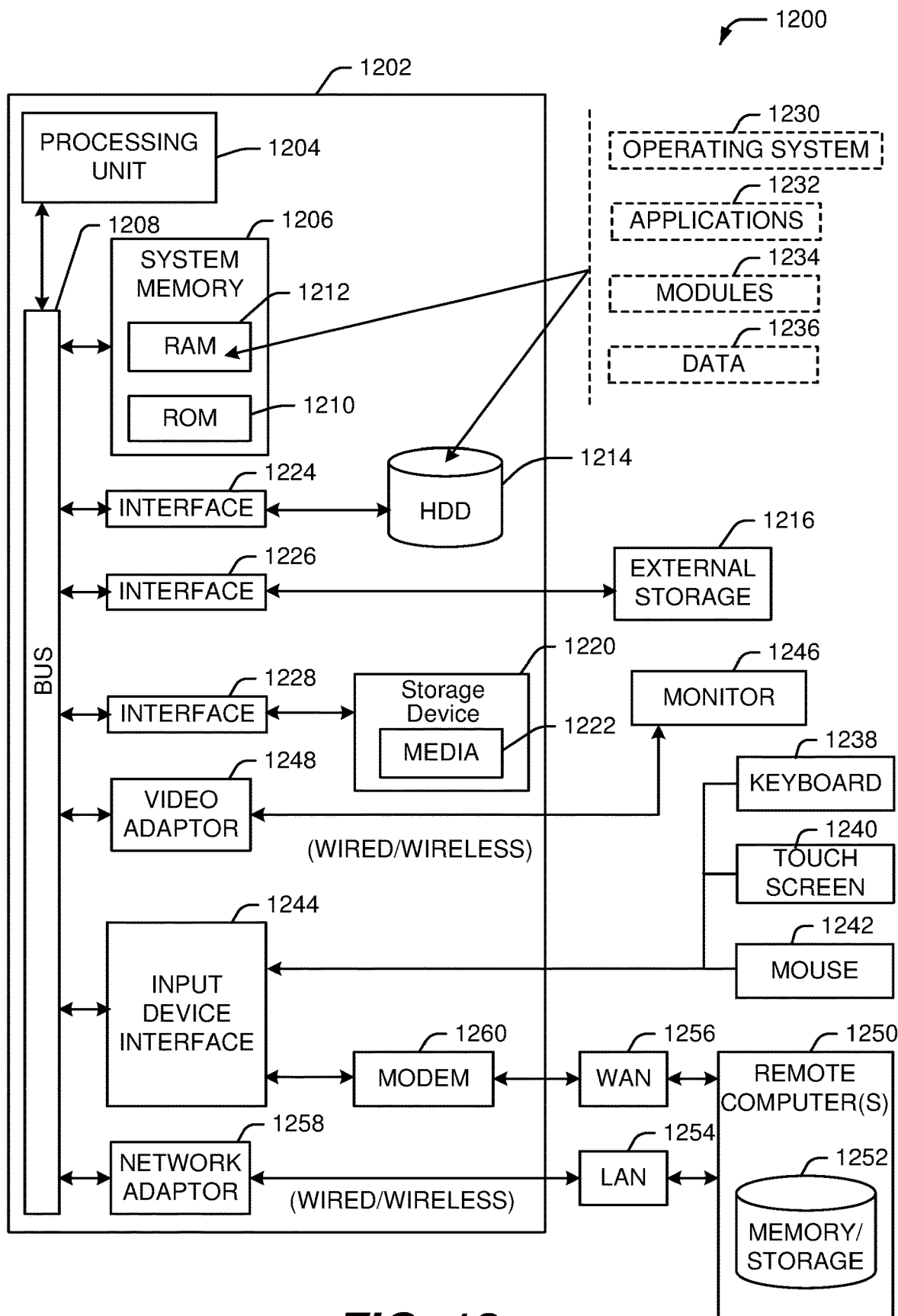
FIG. 12 illustrates an example block diagram of an example computer/machine system operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector." "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
determining, for a group of devices classified into respective classes corresponding to respective priority levels, that available power headroom for power capacity distribution among the group of devices has reached an available power capacity distribution lower limit; and
in response to the determining, reallocating power consumption among the group of devices, comprising increasing first power capacity allocated to a first priority level class and
decreasing second power capacity allocated to a second priority level class,
wherein, prior to the reallocating the power consumption, the available power headroom is above the available power capacity distribution lower limit,
wherein the operations further comprise redistributing power consumption among the devices based on the available power headroom at a sampling interval rate, and
wherein the available power capacity distribution lower limit is reached as a result of a redistribution corresponding to a sampling interval.

2. The system of claim 1, wherein the available power capacity distribution lower limit is zero or substantially zero.

3. The system of claim 1, wherein the increasing the first power capacity allocated to the first priority level class is based on a defined percentage of power capacity allocated to the first priority class prior to the increasing the first power capacity allocated to the first priority level class.

4. The system of claim 1, wherein the increasing the first power capacity allocated to the first priority level class is based on base power capacity determined for the first priority class minus power capacity allocated to the first priority class prior to the increasing the first power capacity allocated to the first priority level class.

5. The system of claim 1, wherein the decreasing the second power capacity allocated to the second priority level class is limited based on a base power level of a device in the second priority level class.

6. The system of claim 1, wherein the operations further comprise decreasing third power capacity allocated to a third priority level class, and wherein the increasing the first power capacity allocated to the first priority level class is based on the decreasing the second power capacity allocated to the second priority level class and the decreasing the third power capacity allocated to the third priority level class.

7. The system of claim 6, wherein the decreasing the second power capacity allocated to the second priority level class and the decreasing the third power capacity allocated to the third priority level class is based on a defined ratio.

8. The system of claim 1, wherein the reallocating power consumption among the group of devices comprises a first reallocating operation at a first time, and wherein the operations further comprise reallocating, in a second reallocating operation at a second time that is after the first time, power consumption among the group of devices, comprising further increasing the first power capacity allocated to the first priority level class and further decreasing the second power capacity allocated to the second priority level class.

9. The system of claim 1, wherein the group of devices corresponds to a rack of devices.

10. The system of claim 1, wherein the group of devices comprises devices in a datacenter.

11. A method, comprising:
determining, in a system comprising a processor in which a group of respective devices are classified by respective priority levels into respective subgroups, that power headroom for power capacity allocation among the group of devices is below an available power capacity distribution lower limit; and
in response to the determining, decreasing first power capacity allocated to a lower priority level subgroup resulting in temporarily available power headroom, and increasing second power capacity allocated to a higher priority level subgroup based on the temporarily available power headroom,
wherein, prior to the decreasing and the increasing, the power headroom is above the available power capacity distribution lower limit,
wherein the operations further comprise redistributing power consumption among the devices based on the power headroom at a sampling interval rate, and
wherein the available power capacity distribution lower limit is reached as a result of a redistribution corresponding to a sampling interval.

12. The method of claim 11, further comprising determining an increment amount based on the second power capacity allocated to the higher priority level subgroup prior to the increasing the second power capacity allocated to the higher priority level subgroup.

13. The method of claim 12, wherein the determining the increment amount based on the second power capacity allocated to the higher priority level subgroup prior to the increasing comprises subtracting the second power capacity allocated to the higher priority level subgroup prior to the increasing, from a base power capacity of the higher priority level subgroup.

14. The method of claim 12, wherein the determining the increment amount based on the second power capacity allocated to the higher priority level subgroup prior to the increasing comprises multiplying the second power capacity allocated to the higher priority level subgroup prior to the increasing by a defined percentage.

15. The method of claim 11, wherein the decreasing the first power allocated to the lower priority level subgroup is based on a base power capacity of a device of the lower priority level subgroup.

16. The method of claim 11, wherein the lower priority level subgroup is a first lower priority level subgroup, and wherein the decreasing the power allocated to the lower priority level subgroup comprises decreasing the power allocated to the first lower priority level subgroup based on a defined ratio of first lower priority level subgroup to a second lower priority level subgroup.

17. A non-transitory machine-readable medium, comprising executable instructions that, when executed by a processor, facilitate performance of operations, the operations comprising:
   determining, for a group of devices classified into respective classes corresponding to respective priority device class levels, the priority device class levels comprising a higher priority level device class relative to at least one other lower priority level device class other than the higher priority level device class, that available power headroom for power capacity distribution among the group of devices has reached an available power capacity distribution lower limit; and
   in response to the determining,
      reallocating power consumption among the group of devices based on the power capacity increment data, comprising increasing power capacity allocated to a first device of the higher priority level class, and
      decreasing power capacity allocated to a second device of the at least one other lower priority level class,
   wherein, prior to the reallocating the power consumption, the available power headroom is above the available power capacity distribution lower limit,
   wherein the operations further comprise redistributing power consumption among the devices based on the available power headroom at a sampling interval rate, and
   wherein the available power capacity distribution lower limit is reached as a result of a redistribution corresponding to a sampling interval.

18. The non-transitory machine-readable medium of claim 17, wherein the at least one other lower priority level class comprises a first lower priority level class and a second lower priority level class that is below the priority level of the first lower priority level class, wherein the second device is classified in the second lower priority level class, and wherein the decreasing the power capacity allocated to the second device comprises determining an amount to decrease the power capacity allocated to the second device based on a defined decrement ratio of the first lower priority level class to the second lower priority level class.

19. The non-transitory machine-readable medium of claim 17, wherein the operations further comprise obtaining power capacity increment data for the higher priority level class based on the lesser of: a base power capacity of the higher priority device class minus a currently allocated power capacity of the higher priority device class, or a defined percentage of the currently allocated power capacity of the higher priority device class.

20. The non-transitory machine-readable medium of claim 19, wherein the obtaining the power capacity increment data for the higher priority level class comprises determining a first power capacity increment amount based on the lesser of the base power capacity of the higher priority device class minus the currently allocated power capacity of the higher priority device class, or the defined percentage of the currently allocated power capacity of the higher priority device class, and reducing the first power capacity increment amount based on a base power capacity of the second device to obtain the power capacity increment data.

* * * * *